Patented Sept. 24, 1935

2,015,578

UNITED STATES PATENT OFFICE 2,015,578

1 - (PARAMETHOXYPHENYL) -2- METHYL-AMINOPROPANE AND ITS ACID ADDITION SALTS

Gordon A. Alles, Monterey Park, Calif.

No Drawing. Application April 21, 1933,
Serial No. 667,196

4 Claims. (Cl. 260—128)

This invention relates to a new chemical compound. The principal object of the invention is to provide a new intermediate for use in the synthetic production of compounds useful for therapeutic purposes.

The compound of my present invention comprises 1-(paramethoxyphenyl)-2-methylaminopropane, $CH_3O \cdot C_6H_4 \cdot CH_2—CH(CH_3)—NHCH_3$, either alone or in combination with an acid as an addition salt. This compound can be demethylated by known processes to yield 1-(parahydroxyphenyl)-2-methylaminopropane,

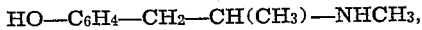

as the free base or in combination with an acid as an addition salt, which is physiologically active and produces effects in animals and man similar to those produced by ephedrine. This same compound can also be methylated by known processes to yield 1-(paramethoxyphenyl)-2-dimethylaminopropane,

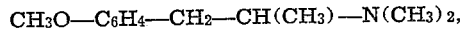

as the free base or in combination with an acid as an addition salt, which in turn may be demethylated by known processes to yield 1-(parahydroxyphenyl)-2-dimethylaminopropane,

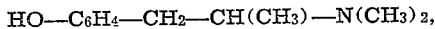

as the free base or in combination with an acid as an addition salt, which is physiologically active and produces effects in animals and man similar to those produced by hordenine.

The method of making 1-(paramethoxyphenyl)-2-methylaminopropane, as the free base or in combination with an acid as an addition salt, preferably comprises the following three steps although it may be produced using other starting materials and processes.

(1) The addition of banzaldehyde to 1-(paramethoxyphenyl)-2-aminopropane,

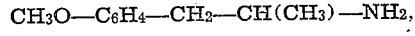

and dehydration of the resultant product to the anhydrous Schiff base, 1-(paramethoxyphenyl)-2-benzalaminopropane,

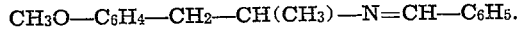

(2) Addition of methyl iodide or similar methyl compound to the anhydrous 1-(paramethoxyphenyl)-2-benzalaminopropane to form the quaternary ammonium salt,

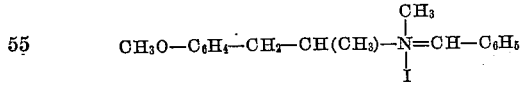

(3) Hydrolysis of this salt with aqueous acid, removal of the benzaldehyde formed and isolation of the desired 1-(paramethoxyphenyl)-2-methylaminopropane as the free base or in combination with an acid as an addition salt. These three steps can be carried out with good yield in the following manner:

1. One mol of 1-(paramethoxyphenyl)-2-aminopropane base and one mol of benzaldehyde are mixed and after the initial reaction is completed, water is distilled from the mixture by heating above 100° C. under atmospheric pressure. The resultant Schiff base may be used without further treatment or may be purified by distillation under reduced pressures. It boils at 190-195° C. under a pressure of 10-15 mm. of mercury.

2. One mol of anhydrous 1-(paramethoxyphenyl)-2-benzalaminopropane and one mol of methyl iodide are mixed and placed in a sealed container. After heating a few hours in a boiling water bath there is formed a glassy mass of the quaternary ammonium salt product above mentioned.

3. Solution of this product in 200 cc. methanol followed by addition of 100 cc. concentrated hydrochloric acid and 300 cc. water, followed by warming for a short time in a hot water bath hydrolyzes benzaldehyde off from the quaternary ammonium salt, and extraction with ether removes the benzaldehyde from the aqueous mixture. Sodium hydroxide is then added to liberate the base present which is then removed by extraction with benzene. This benzene extract contains the desired 1-(paramethoxyphenyl)-2-methylaminopropane, which may be obtained as the free base by distilling off the benzene. The product may then be purified by distilling under reduced pressure. If a salt is desired it may best be prepared by extraction of the benzene solution of the base with an aqueous solution of the acid required and evaporation of the water present. If a crystalline salt is to be obtained, it may be formed by solution in a solvent therefor, and allowing the salt to crystallize.

The free base distills at 133° C. under a pressure of 15 mm. of mercury or at 145° C. under a pressure of 25 mm. of mercury. The hydrochloride crystallizes from ethanol without solvent of crystallization and melts when pure at 176-177° C. The hydrobromide crystallizes from the same solvent and melts when pure at 148-149° C. The neutral sulphate can be made but is not readily crystallizable. The acid oxalate, melting at 94° C., is crystallizable from water or from ethanol with the addition of ethyl acetate or ether.

The free base or its addition salts are suitable for use as intermediates in the synthetic production of pure 1-parahydroxyphenyl-2-methylaminopropane as the free base or in combination with an acid as an addition salt and also in the synthetic production of pure 1-(parahydroxyphenyl)-2-dimethylaminopropane as the free base or in combination with an acid as an addition salt. Both of these compositions are believed to be new and useful and are the subject of separate applications filed by me of even date herewith, and methods for the conversion of the composition of the present application into these new compositions are therein described.

I claim:

1. The chemical compounds 1-paramethoxyphenyl)-2-methylaminopropanes of the group consisting of 1-(paramethoxyphenyl)-2-methylaminopropane and the acid addition salts of 1-(paramethoxyphenyl)-2-methylaminopropane.

2. The chemical compound 1-(paramethoxyphenyl)-2-methylaminopropane.

3. The chemical compounds consisting of acid addition salts of 1-(paramethoxyphenyl)-2-methylaminopropane.

4. The chemical compound 1-(paramethoxyphenyl)-2-methylaminopropane hydrochloride.

GORDON A. ALLES.